(12) United States Patent
Schinner

(10) Patent No.: US 7,312,817 B2
(45) Date of Patent: Dec. 25, 2007

(54) PRINTER AND DOCKING STATION HAVING A DIGITAL CAMERA DOCKING PORT WITH AN IMAGE MAGNIFIER

(75) Inventor: Charles E. Schinner, Windsor, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 962 days.

(21) Appl. No.: 10/420,327

(22) Filed: Apr. 22, 2003

(65) Prior Publication Data

US 2004/0212822 A1 Oct. 28, 2004

(51) Int. Cl.
*H04N 5/225* (2006.01)
(52) U.S. Cl. .................................... 348/207.2
(58) Field of Classification Search .............. 348/207.2
See application file for complete search history.

(56) References Cited

U.S. PATENT DOCUMENTS

| | | | |
|---|---|---|---|
| 6,115,137 A | 9/2000 | Ozawa et al. | |
| 6,167,469 A | 12/2000 | Safai et al. | |
| 6,229,565 B1 | 5/2001 | Bobry gug | |
| 6,453,125 B2* | 9/2002 | Shono | 396/287 |
| 6,493,108 B1 | 12/2002 | Hirai | |
| 6,552,743 B1* | 4/2003 | Rissman | 348/207.2 |
| 6,693,665 B1* | 2/2004 | Shindo et al. | 348/207.2 |
| 6,833,867 B1* | 12/2004 | Anderson | 348/231.9 |
| 7,034,877 B2* | 4/2006 | Schmidt | 348/333.01 |
| 7,038,714 B1* | 5/2006 | Parulski et al. | 348/207.2 |
| 7,075,579 B2* | 7/2006 | Whitby et al. | 348/375 |
| 7,167,206 B2* | 1/2007 | Kayanuma | 348/375 |
| 2002/0071035 A1* | 6/2002 | Sobol | 348/207 |
| 2003/0156200 A1* | 8/2003 | Romano et al. | 348/207.99 |
| 2003/0214602 A1* | 11/2003 | Battles et al. | 348/375 |
| 2004/0070681 A1* | 4/2004 | Battles et al. | 348/333.01 |
| 2004/0150944 A1* | 8/2004 | Byrne et al. | 361/683 |
| 2004/0169327 A1* | 9/2004 | Swayze et al. | 271/145 |
| 2004/0169727 A1* | 9/2004 | Romano et al. | 348/207.2 |

OTHER PUBLICATIONS

Kodak Data sheet: "Kodak EasyShare Printer Dock 6000 Specification", Eastman Kodak Company, New York, http://www.kodak.com/eknec/PageQuerier.jhtml?pq.path=940&pq.locale=en_US&pq.pf=1, Apr. 21 23:27:03 EDT, 2003.

* cited by examiner

*Primary Examiner*—David Ometz
*Assistant Examiner*—Usman Khan

(57) ABSTRACT

The present invention directly interfaces a digital camera to a printer for printing images stored by the digital camera. A printer that directly docks with the digital camera includes a docking port and an image magnifier. The docking port includes mechanical and data interfaces between the printer and the digital camera. The digital camera includes a display unit that is used for viewing the images magnified by the image magnifier while the digital camera is interfaced to the printer. A docking station that docks the digital camera to a printer includes a docking port and an image magnifier. The docking port includes a mechanical interface to the digital camera and a data interface to the digital camera and the printer. The printer and the docking station may include a user interface to manipulate the images stored by the digital camera.

20 Claims, 6 Drawing Sheets

PRINTER AND DOCKING STATION HAVING A DIGITAL CAMERA DOCKING PORT WITH AN IMAGE MAGNIFIER

TECHNICAL FIELD

The invention relates to digital imaging including digital photography. In particular, the invention relates to printers used to print digital images recorded by a digital camera.

BACKGROUND OF THE INVENTION

With the advent of digital cameras, digital imaging has been introduced to a mass consumer market. In particular, digital photography equipment is now readily available to the average consumer. Digital photography equipment includes, but is not limited to, digital cameras to capture images and printers to render the images in a fixed form. Currently, printers used to capture and record digital images from digital cameras generally include printers based on laser technology or inkjet technology.

While most printers used to print digital images are coupled to and depend on the presence of a personal computer (PC), a recent trend has seen the introduction of printers that can print images without a PC. In some cases, a connection between the camera and printer is provided by one or more of an array of available interconnect technologies including, but not limited to, wireless networking, universal serial bus (USB) interconnection, and infrared networking. In other cases, a memory card or other memory storage media is used to transfer image files from the camera to the printer. In particular, printers equipped with one or more memory card ports accept a memory card (e.g., SmartCard™, MemoryStik™, CompactFlash™, etc.) from the camera and provide a means for choosing and printing images stored thereon.

Unfortunately, such camera-to-printer printing configurations generally suffer from a common problem created by the lack of a PC in the imaging processing and printing process. Namely, a user typically needs to select and sometimes edit an image prior to printing. While the costs associated with printing images has dropped dramatically in recent years, printing an image may still involve a substantial fixed cost associated with the printing media (e.g., paper) and ink/toner. Thus, it is generally advantageous if the user can view, select, and perhaps edit (e.g., crop, enhance, sharpen, etc.) an image before committing the image to print. Attempts to enable such selection and/or image editing in camera-to-printer configurations include incorporating a display unit (e.g., an LCD display) into the printer and/or printing a proof sheet of thumbnail images from which a given image may be selected for final printing. Adding a display unit to a printer can significantly increase the cost of the printer. While printing proof sheets is less costly than adding a display unit, printing proof sheets wastes paper, ink/toner, and time in the rendering of a final image using the printer.

Accordingly, it would be advantageous to have a means for direct camera-to-printer printing that provided a means for selecting and otherwise controlling the image printing process on an image-by-image basis. Moreover, it would be advantageous is such a direct camera-to-printer image printing avoided the high costs of providing a dedicated printer display unit and/or the wasted paper, ink/toner and/or time using proof sheets. Such a direct camera-to-printer image printing would address a long-standing need in the area of digital image printing.

SUMMARY OF THE INVENTION

The present invention directly interfaces a digital camera to a printer and provides a means for selecting and controlling the images printed by the printer. In particular, the present invention prints an image from a digital camera directly to a printer, without an intervening personal computer (PC) or without using memory storage media transfer. In addition, the present invention employs an image magnifier to magnify an image displayed by a display unit of the digital camera.

In an aspect of the present invention, a printer that prints an image directly from a digital camera is provided. The printer comprises means for interfacing the digital camera directly to the printer, such that the image stored in the digital camera is communicated to the printer. The printer further comprises an image magnifier. The image magnifier magnifies an optical image produced by the digital camera display unit while the digital camera is interfaced. In part, the image magnifier enables the user to more readily view the image displayed by the camera display unit. The printer further comprises a printing engine that converts the image, from the interfaced digital camera, into a printed image. The printer enables the digital camera to be connected or 'docked' directly to the printer without the need for a personal computer (PC), a USB connection, a memory card port or other interfacing or networking means between the printer and the camera. Images stored in the directly docked camera are viewed through the image magnifier using a display unit of the docked digital camera. Depending on the embodiment, a user interface associated with the printer or the digital camera is used in conjunction with the display unit to one or more of view, select, edit and designate for printing an image.

In another aspect of the invention, a docking station that docks a digital camera with a printer for direct printing of an image stored in the digital camera is provided. The docking station comprises a docking port and a display image magnifier. The docking port provides means for interfacing the digital camera directly to the docking station and to the printer. The docking port comprises a mechanical interface between the digital camera and the docking station, and an electrical interface between the digital camera, the docking station and the printer while the digital camera is docked to the docking port. The image magnifier is adjacent to a display unit of the digital camera when docked in the docking port. The display unit is used by a user of the docking station to view the image to be printed from the digital camera. The image magnifier provides a magnified view of the image displayed to the user.

One or more of the following features and/or advantages may be realized by the present invention. The printer prints the selected images and prints the selected images in a final form, i.e., after editing or other manipulation, to reduce or preferably minimize wasted ink/toner and paper. A PC is not needed to view, select, and/or edit or otherwise manipulate images stored in a memory of the digital camera. Moreover, viewing, selecting, and/or editing of images to be printed are accomplished using the display unit of the digital camera. Use of the camera display unit eliminates a need for an additional, often costly, dedicated display unit on the printer or on the docking station. The display unit magnifier aids in viewing menus and displayed images during image selection and editing. Certain embodiments of the present invention have other advantages in addition to and in lieu of the advantages described hereinabove. These and other features and advantages of the invention are detailed below with reference to the following drawings.

BRIEF DESCRIPTION OF THE DRAWINGS

The various features and advantages of the present invention may be more readily understood with reference to the following detailed description taken in conjunction with the accompanying drawings, where like reference numerals designate like structural elements, and in which.

MODES FOR CARRYING OUT THE INVENTION

Figure 1:
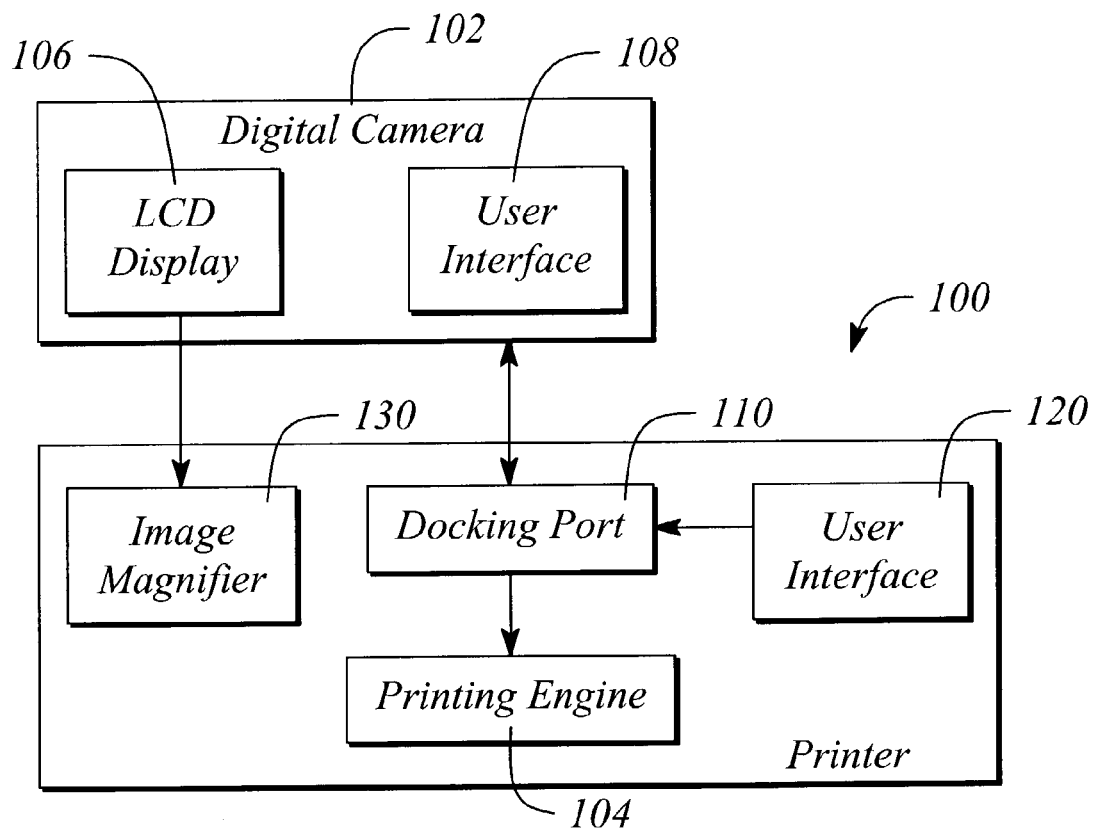
FIG. 1 illustrates a block diagram of a camera docking port-equipped printer according an embodiment of the present invention.

FIG. 1 illustrates a block diagram of a docking port-equipped printer 100 according an embodiment of the present invention. The docking port-equipped printer 100 provides means for interfacing that facilitates connecting a digital camera 102 directly to the printer 100. In particular, the digital camera 102 is connectable to the printer 100 without the use or need for a personal computer (PC) or equivalent image-processing device between the printer 100 and the digital camera 102. Further, a memory card need not be transferred from the digital camera 102 to the printer 100 for printing of images stored thereon. Instead, images stored in either a removable or non-removable memory of the digital camera 102 may be accessed and printed directly from the digital camera 102. Still further, the connection between the digital camera 102 and the printer 100 is without a need for a cable, such as a USB cable. Moreover, in addition to facilitating direct-to-printer transfers of stored images, the docking port-equipped printer may provide for recharging of rechargeable batteries of the digital camera 102, among other things, while the digital camera is connected or docked to the printer 100.

With the digital camera 102 connected to the printer 100, the user can direct the printer 100 to print images stored as image files in a memory of the digital camera 102 directly from the digital camera 102. As mentioned above, the memory may be of either a removable or non-removable type. Printing generally involves rendering the image onto a print media, such as paper or transparency film. The printer 100 may be either a monochromatic printer or a color printer according to the present invention that uses one or both of laser and inkjet technologies.

A printing engine 104 of the printer 100 is responsible for rendering the images. The printing engine 104 receives an image in the form of an image file from the digital camera 102 and performs the actual image printing. Thus, the printing engine 104 is a means for printing or rendering the image. Furthermore, the printer 100 employs a display unit 106 of the digital camera 102 for viewing the images to be printed. The printing engine 104 is a conventional printing engine 104 familiar to those skilled in the art. In some embodiments, the printing engine 104 is located in the camera 102 instead of in the printer 100

The display unit 106 may be a liquid crystal display (LCD) 106, for example, or another type of display unit known in the art, and depends on the digital camera 102. The display unit 106 of the digital camera 102 displays an optical image captured by the digital camera 102. In addition, the display unit 106 displays images contained in image files stored in memory of the digital camera 102. The display unit 106 is used by a user of the printer 100 to view and select images for printing with the printer 100.

The docking port-equipped printer 100 of the present invention comprises a docking port 110. The docking port 110 accepts the digital camera 102 and provides a mechanical interface and data interface for connecting the digital camera 102 to the printer 100. When the digital camera 102 is attached to the docking port 110, the camera 102 is said to be directly 'docked' to the docking port 110 and, by extension, to the docking port-equipped printer 100. Image files are transferred from the docked digital camera 102 to the printing engine 104 through the docking port 110 data interface for printing.

The mechanical interface (not illustrated) accepts and holds or mechanically supports the docked camera 102. In some embodiments, the mechanical interface is 'device-specific' in that it is uniquely shaped to accommodate a particular make and/or model of the digital camera 102. In other embodiments, the mechanical interface is adapted to accept and hold a plurality of different makes and/or models of the digital camera 102, such that the printer 100 can be directly docked with any digital camera make or model. In yet other embodiments, an adaptor (not illustrated) adapts the mechanical interface of the docking port 110 to the particular make and/or model of the digital camera 102. The adaptor can be either device specific or a 'universal' and directly interfaces to the mechanical interface of the docking port 110. By 'universal' it is meant that the adaptor or mechanical interface accommodates multiple different digital camera 102 makes and/or models. One skilled in the art is familiar with conventional camera docking stations, all mechanical interfaces of which may be used in conjunction with the docking port 110 of the present invention.

The data interface (not illustrated) provides means for transferring data, including image files and command/control information, between the printer 100 and the digital camera 102. In some embodiments, the data interface is an electrical interface comprising a multi-pin electrical connector. The multi-pin electrical connector is adapted to cooperatively mate with a mating connector on the digital camera 102. Image data (e.g., image files) and status information from the camera 102 are transferred to the printer 100 through the electrical interface. In addition, command and control information from the printer 100 may be transferred to the camera 102 through the electrical interface. The electrical interface also may supply power in the form of a voltage and a current to the digital camera 102. The supplied power may be used to charge a battery of the camera 102 and/or to provide operational power to the docked digital camera 102. Other interface technologies including, but not limited to, infrared, wireless, and inductive may be used instead of or in addition to a multi-pin connector for the data interface of the docking port 110 without exceeding the scope of the present invention.

The docking port-equipped printer 100 further comprises a user interface 120. The user interface 120 provides the user of the printer 100 with a means for viewing and selecting images for printing. In some embodiments, the user interface 120 also may provide the user with a means for editing or otherwise manipulating images prior to printing. The user interface 120 employs the display unit 106 of the digital camera 102 to display an optical image representing an image file stored in the digital camera 102 memory. In addition, the display unit 106 may be used to display a menu and/or other alphanumeric information associated with viewing and selecting the stored images. For example, the display unit 106 may display an alphanumeric image file list from which a particular stored image file may be selected and viewed.

The user interface 120 comprises a set of buttons or keys 122. The keys 122 are employed by the user to interact with the printer 100 and, through the connection provided by the docking port 110, to interact with the docked digital camera 102. In some embodiments, the user interface 120 comprises keys 122 integral to the printer 100. In other embodiments having a removable docking port 110 portion (not illustrated), the keys and/or buttons of the user interface 120 are located on the removable portion. In yet other embodiments, the user interface 120 uses keys of a user interface 108 of the digital camera 102.

Referring again to FIG. 1, the docking port-equipped printer 100 further comprises an image magnifier 130. The image magnifier 130 receives the optical image produced by the display unit 106 of the digital camera 102. The image magnifier 130 magnifies the received optical image. The magnified optical image is then available for viewing by the user.

The image magnifier 130 may be a lens or set of lenses mounted in a frame and positioned such that the image magnifier 130 is between the display unit 106 and the user when the digital camera 102 is docked to the printer 100. For example, the image magnifier 130 may comprise a Fresnel Lens. In another example, the image magnifier 130 may be one or more conventional lens. The image magnifier 130 increases a size of the optical image viewed by the user relative to that produced by the display unit 106. The increased image size makes viewing the optical image easier for the user, among other things. In some embodiments, a magnification and/or a focusing of the image magnifier 130 may be adjustable. For example, a position of the image magnifier 130 with respect to the display unit 106 may be changeable to facilitate the adjustability of one or both of the magnification and the focus of the magnifier 130. In another example, a position of one or more lenses within the display magnifier 130 may be changeable relative to a position of one or more other lenses to provide adjustability to one or both of the focus and the magnification. One skilled in the art can readily devise numerous means for adjusting the focus and/or magnification of a lens or lens system, all of which are within the scope of the present invention.

Figure 2A:
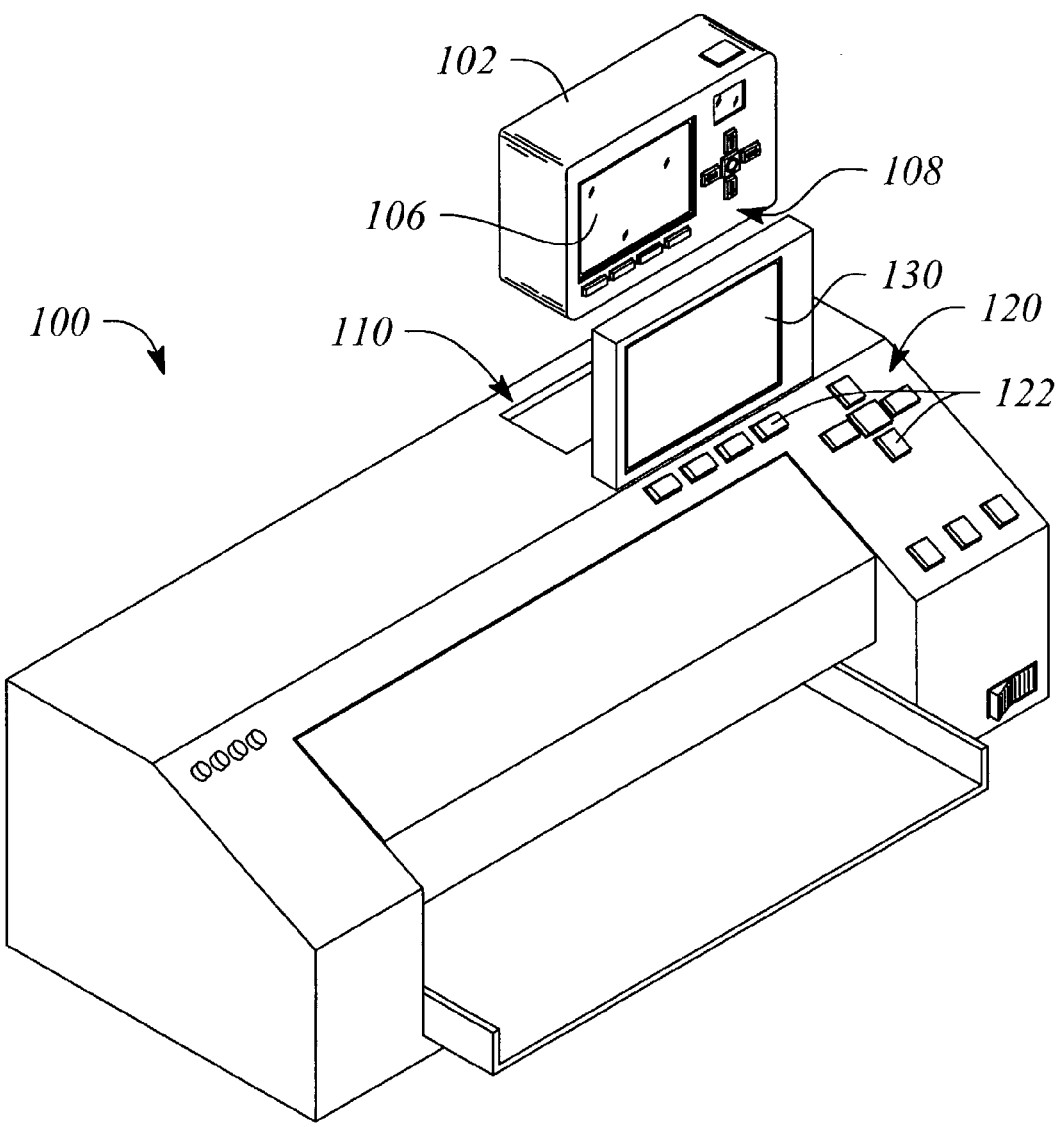
FIG. 2A illustrates a perspective view of an embodiment of a docking port-equipped printer having an image magnifier according to the present invention.
Figure 2B:
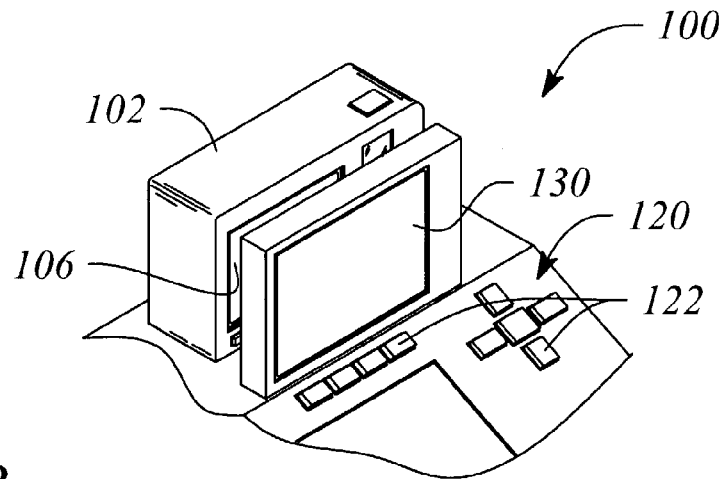
FIG. 2B illustrates a perspective view of a portion of the docking port-equipped printer illustrated in FIG. 2A in a vicinity of the docking port.

FIG. 2A illustrates a perspective view of an embodiment of the docking port-equipped printer 100 having an image magnifier 130 according to the present invention. In particular, the digital camera 102 illustrated in FIG. 2A is shown undocked. FIG. 2B illustrates a perspective view of a portion of the docking port-equipped printer 100 illustrated in FIG. 2A in a vicinity of the docking port 110. In particular as illustrated in FIG. 2B, the digital camera 102 is docked to the docking port 110.

Figure 2C:
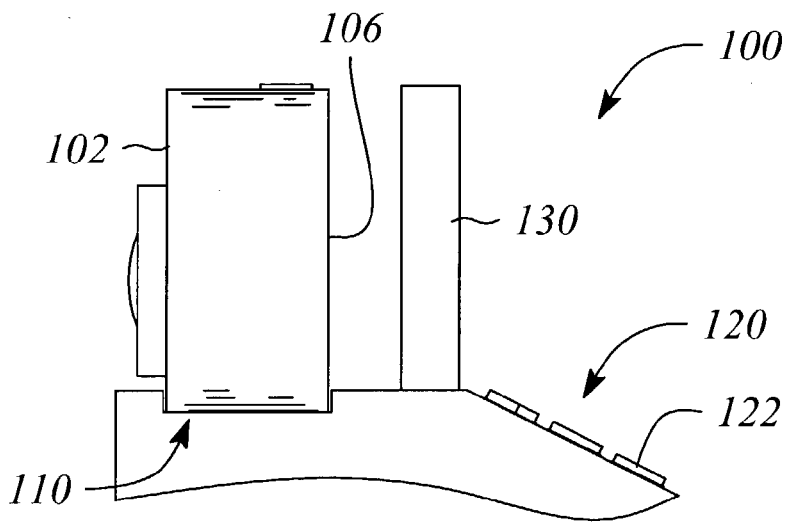
FIG. 2C illustrates a side view of a digital camera docked in the docking port of the docking port-equipped printer illustrated in FIG. 2A.

FIG. 2C illustrates a side view of the digital camera 102 docked in the docking port 110 of the docking port-equipped printer 100 illustrated in FIG. 2A. In particular, the image magnifier 130 is adjacent to (i.e., in front of) the display unit 106 when the digital camera 102 is docked, such that the image magnifier 130 is between the display unit 106 and the user. Thus, the user views a magnified optical image displayed by the display unit 106 due to presence of the image magnifier 130.

Figure 2D:
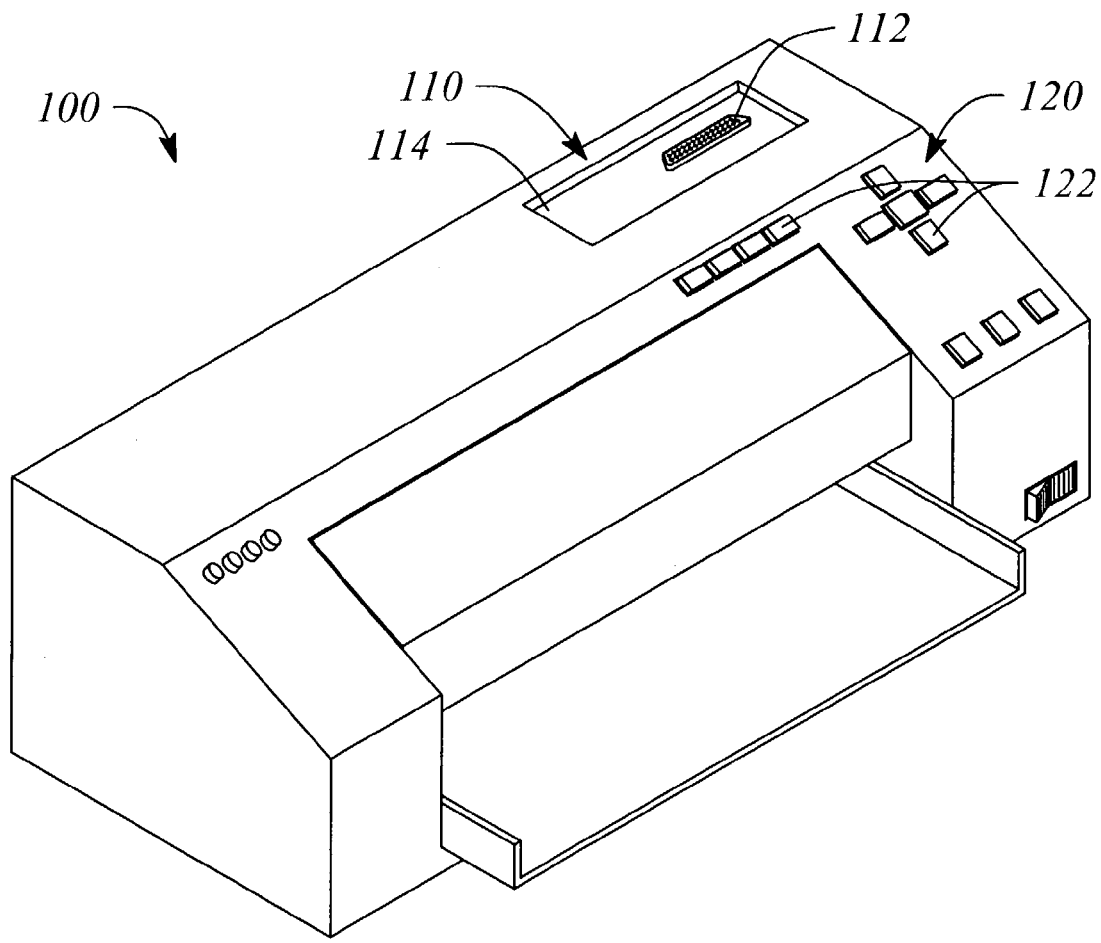
FIG. 2D illustrates the docking port-equipped printer embodiment illustrated in FIG. 2A with the image magnifier omitted to enable the docking port to be visible.

FIG. 2D illustrates the docking port-equipped printer 100 embodiment illustrated in FIG. 2A with the image magnifier 130 not shown so that the docking port 110 is visible. The docking port 110 is illustrated by way of example in FIG. 2D as an indentation 114 in a top surface of the printer 100. The indentation 114 is adapted to accept the digital camera 102 and thus, acts as the mechanical interface of the docking port 110. A multi-pin connector 112 is located within the indentation 114. The multi-pin connector 112 serves as the data or electrical interface for the docking port 110. The docking port 110 is illustrated in FIGS. 2A-2D on a top surface of the printer 100 for ease of access. However, while illustrated on the top surface, the docking port 110 may be located on any surface of the printer 110 or even located internal to the printer 100 and still be within the scope of the present invention. For example, an internally located docking port 110 may be accessed by way of a fold-out door or a removable cover on the printer 100.

Figure 3:
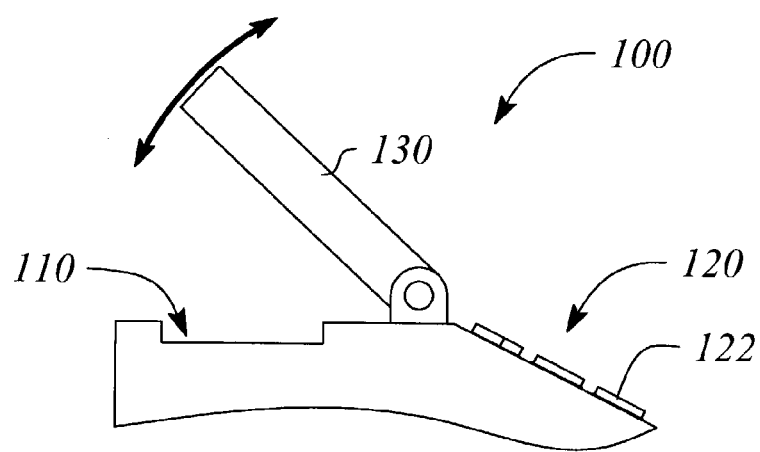
FIG. 3 illustrates a side view of an embodiment of docking port-equipped printer having a tiltable image magnifier.

In some embodiments, the image magnifier 130 is tiltable or movable about an axis to adjust an angle for improved viewing by the user. A hinge mechanism or other means can be used to effect the tiltability or movability of the image magnifier 106. FIG. 3 illustrates a side view of an embodiment of docking port-equipped printer 100 having a tiltable image magnifier 130. Tilting of the image magnifier 130 is indicated in FIG. 3 by a curved arrow and the magnifier 130 is shown in a partially stowed position (i.e., approximately half way between stowed (e.g., horizontal position) and deployed (e.g., vertical position)). In addition to providing for storage, movability of the image magnifier 130 may also be employed to improve a viewability of the display unit 106 by the user, as mentioned hereinabove. For example, the image magnifier 130 may be moved by a user so that the display unit 106 may be more readily viewed by the user from a particular viewing angle or direction.

It should be noted that the movability of the image magnifier 130 also applies to the docking port 110. Although not illustrated, the docking port 110 may be mounting on a table or pedestal mechanism that swivels, for example, about a pivot, such that the docking port 110 is tiltable, twistable, slideable, or moveable and otherwise is adjustable for better viewing of the display unit 106 by the user through the image magnifier 130, while maintaining the electrical interface between the digital camera 102 and the printer 100. One skilled in the art can readily devise numerous means for moving and adjusting a pedestal, for example, all of which are within the scope of the present invention.

Figure 4:
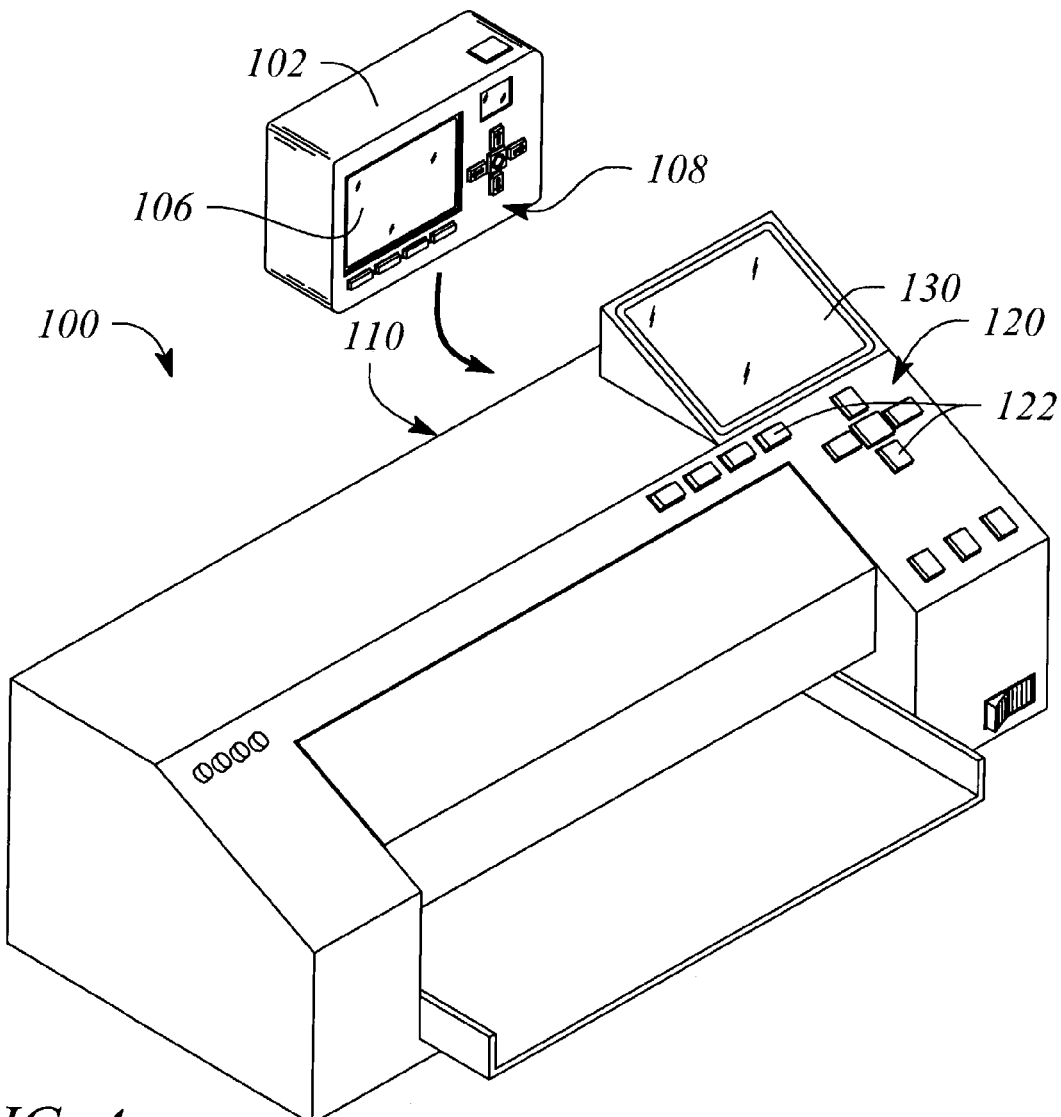
FIG. 4 illustrates a perspective view of another embodiment of a docking port-equipped printer according to the present invention.

FIG. 4 illustrates another embodiment of the docking port-equipped printer 100 having an image magnifier 130. In particular, the docking port 110 of the printer 100 illustrated in FIG. 4 is located inside the printer 100. The digital camera 102 is inserted into an aperture (not illustrated) in a back surface of the printer 100 to dock the camera 102. The aperture may be accessed using a door or a removable panel, for example. The bold arrow in FIG. 4 generally points to a direction of insertion by way of example. The image magnifier 130 displays the magnified image for the user as described herein above. Alternatively, the digital camera 102 may be similarly inserted into an aperture (also not illustrated) in a side surface of the printer 100 preferably closest to the image magnifier 130. The inserted digital camera directly docks with the printer 100 using the internal docking port 110.

Figure 5:
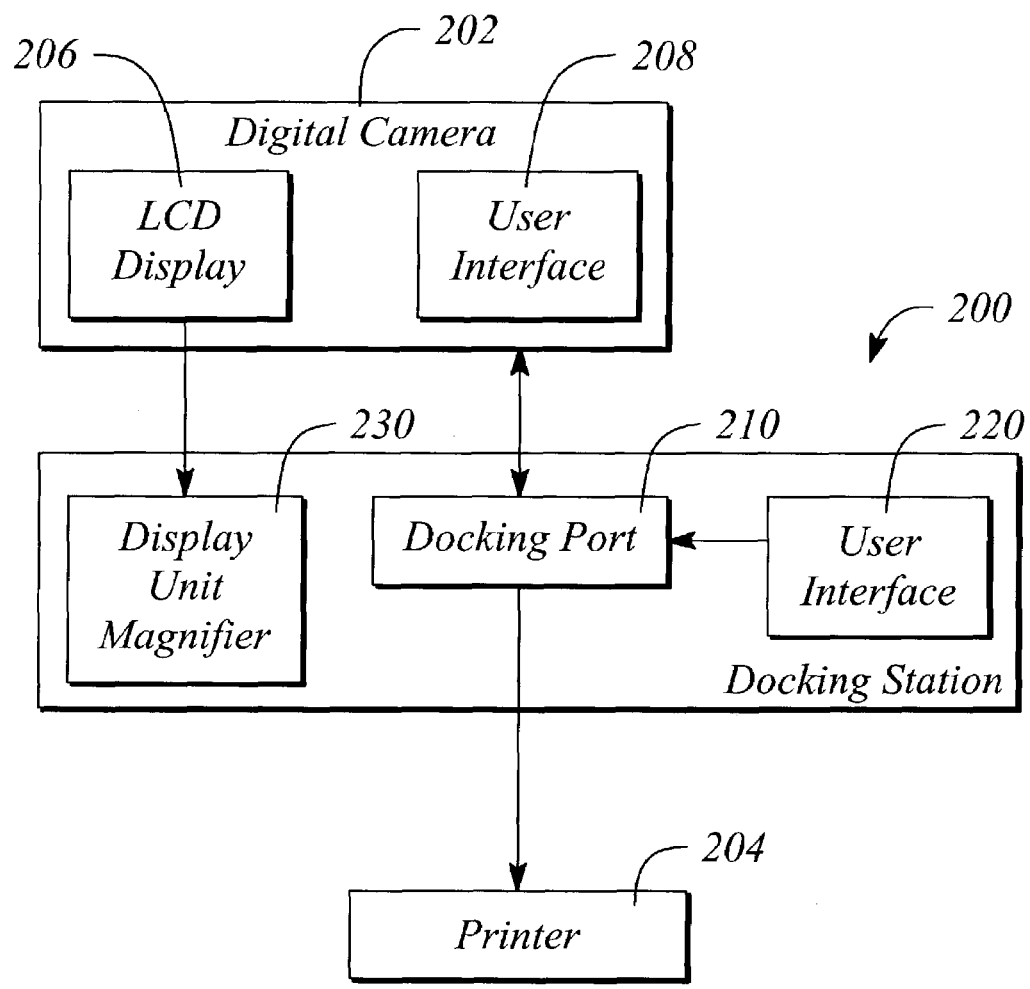
FIG. 5 illustrates a block diagram of a digital camera docking station adapted for direct camera-to-printer image printing according to an embodiment of the present invention.
Figure 6:
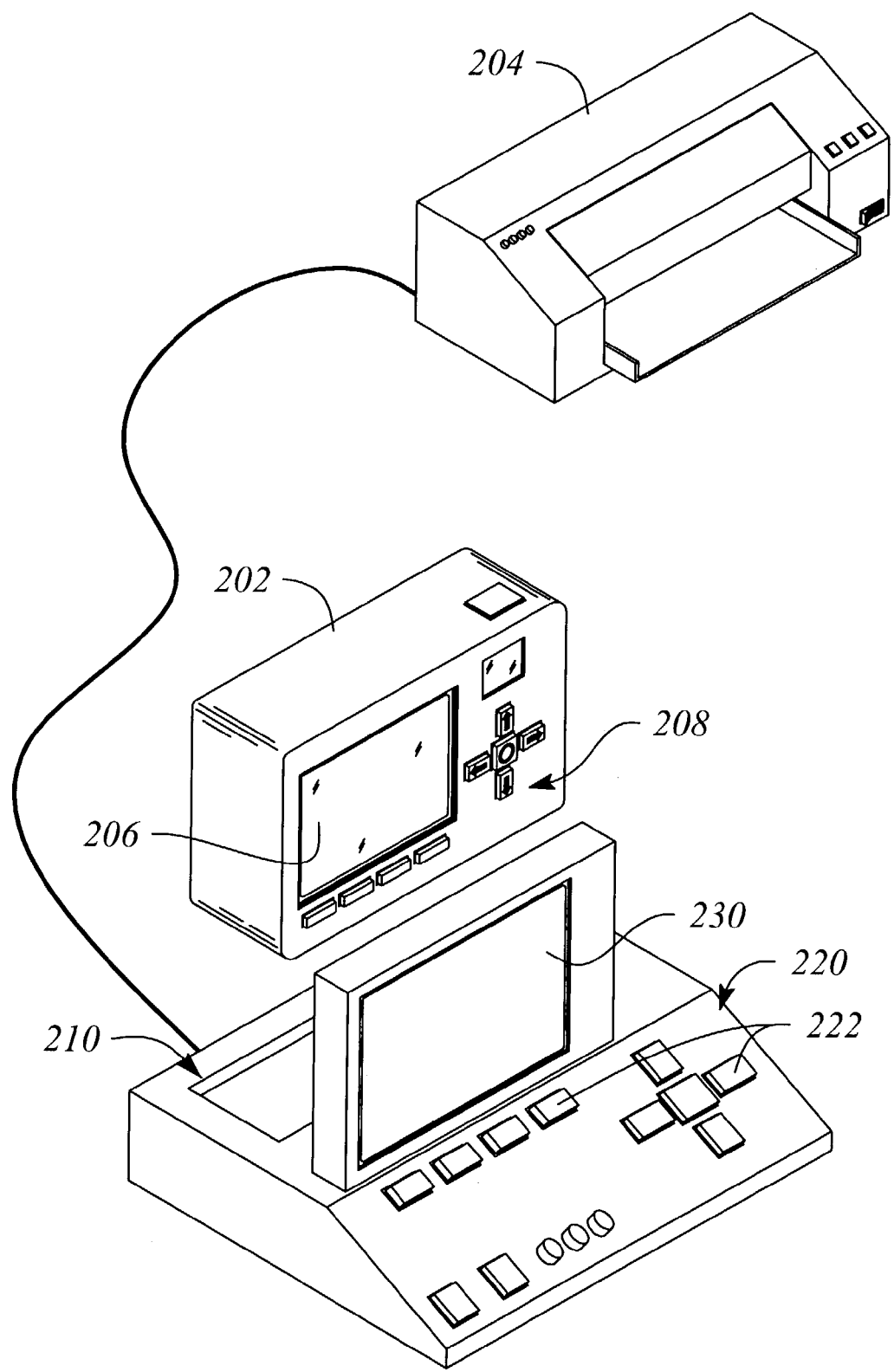
FIG. 6 illustrates perspective view an embodiment of the digital camera docking station illustrated in FIG. 5.

FIG. 5 illustrates a block diagram of a digital camera docking station 200 adapted for direct camera-to-printer image printing according to an embodiment of the present invention. FIG. 6 illustrates perspective view an embodiment of the digital camera docking station 200 illustrated in FIG. 5. The docking station 200 accepts a digital camera 202 for direct docking. Furthermore, the docking station 200 connects directly or indirectly to a printer 204. A display unit 206 of the digital camera 202 is employed by a user in conjunction with the docking station 200 to view and select images stored as image files within a memory of the digital camera 202. Once selected, the docking station 200 transfers the selected image files directly to the printer 204 for printing.

In some embodiments, the docking station 200 is connected to the printer 204 by a serial or a parallel interface cable attached to an associated respective serial or parallel port of the printer 204. For example, a universal serial bus (USB) cable may be used to connect the docking station 200 to a USB port of the printer 204. In other embodiments, a wireless interface such as, but not limited to, a radio frequency (RF) link or an infrared link (IR), between the docking station 200 and the printer 204 may be employed. One skilled in the art is familiar with a variety of means for connecting to a peripheral device to a printer 204. The docking station 200 of the present invention may employ any such means. In yet other embodiments, the docking station 200 may attach directly to the printer 204 by way of a docking station connection port (not illustrated) of the printer 204.

The docking station 200 adapted for direct camera-to-printer image printing (also referred to herein as the 'printer-adapted docking station 200') comprises a camera docking port 210, a printer-oriented user interface 220, and a display unit magnifier 230. The docking port 210 is similar to the docking port 110 described hereinabove with respect to the printer 100. In particular, the docking port 210 provides a mechanical interface and data interface for directly connecting the digital camera 202 to the docking station 200. For example, the mechanical interface may comprise an indentation in a shell or housing of the docking station 200, the indentation being adapted to directly accept and hold the digital camera 202. Similarly for example, the data interface may comprise a multi-pin electrical connector. The multi-pin connector of the docking port 210 may provide electrical power to the digital camera 202 in addition to providing a bi-directional data interface. Moreover, as with the docking port 110 of the printer 100, described hereinabove, the docking port 210 may be either device-specific or capable of accepting more than one make/model of digital camera 202 (i.e., universal). In addition as described above, the docking station 200 may employ a docking adaptor (not illustrated) to adapt a mechanical and/or electrical configuration of the digital camera 202 to a specific mechanical and data interface of the docking station 200.

The printer-oriented user interface 220 is essentially similar to the user interface 120 described hereinabove with respect to the printer 100. In some embodiments, the printer-oriented user interface 220 comprises keys 222 integral with the docking station 200. The keys 222 in conjunction with the display unit 206 of the digital camera 202 facilitate a user interaction with the docked digital camera 202. The keys 222 enable the user to select an image stored by the digital camera for viewing, to manipulate or edit the selected image using features and functions of the digital camera 202, and to direct the selected image directly to the printer 204 for printing. In other embodiments, a user interface 208 of the digital camera 202 is also the printer-oriented user interface 220 that provide interface keys 222 for such user interaction, so that two separate user interfaces 208 and 220 are not necessary.

The display unit magnifier 230 is essentially the same as the image magnifier 130 described hereinabove with respect to the printer 100. In particular, the display unit magnifier 230 is a lens-based image magnifier. For example, the display unit magnifier 230 may comprise one or more of a Fresnel lens and/or a conventional lens. The display unit magnifier 230 is located adjacent to (i.e., in front of) the display unit 206 of the docked digital camera 202, such that the display unit magnifier 230 is positioned between the display unit 206 and a viewing position of the user when the digital camera 202 is docked to the docking station 200. As such, an optical image produced by the display unit 206 is viewed by the user through the display unit magnifier 230 as a magnified image.

The docking station 200 provides a convenient means for selecting, viewing, optionally editing or otherwise manipulating, and then directly printing images stored as image files within the digital camera 202 with the printer 204. Moreover, the docking station 200 directly connects to the printer without the need for an intervening PC or equivalent image processing device or system. FIG. 6 illustrates a tethered connection between the docking station 200 and the printer 204. However as mentioned above, in some embodiments the direct connection between the docking station 200 and the printer 204 can be a wireless connection or a multi-pin direct connection similar to that described above between the printer 100 and the digital camera 102 using the docking port 110. The docking station 200 employs the display unit 206 of the docked digital camera 202, such that a need for a costly display unit integral to the docking station 200 is not necessary. In addition, the display unit magnifier 230 magnifies images displayed by the digital camera display unit 206 making viewing of display images easier for the user. As such, the user views the display unit 206 of the digital camera 202 through the display unit magnifier 230 and employs the user interface 220 to select an image for printing. The docking station 200 then transfers the selected image directly to the printer 204 wherein the image is printed.

Thus, there have been described a docking port-equipped printer and a printer-adapted docking station both of which facilitate direct camera-to-printer image printing. It should be understood that the above-described embodiments are merely illustrative of some of the many specific embodiments that represent the principles of the present invention. Clearly, those skilled in the art can readily devise numerous other arrangements without departing from the scope of the present invention as defined by the following claims.

What is claimed is:

1. A printer that prints an image directly from a digital camera, the printer comprising:
   a docking port that docks the digital camera comprising:
      a mechanical interface that accepts and holds the digital camera; and
      a data interface that receives an image file stored in the docked digital camera; and
   an image magnifier that magnifies an image displayed by a camera display unit while the digital camera is docked to the docking port, the image magnifier being independent of the digital camera,
   wherein the image magnifier remains with the printer when the digital camera is undocked from the docking port.

2. The printer of claim 1, wherein while the digital camera is docked in the docking port, a user of the printer views the magnified image using the display unit.

3. The printer of claim 1, further comprising:
   a user interface in electrical communication with the docking port, the user interface comprising buttons or keys that a user manipulates in order to one or more of view, select, edit and print an image from the image file stored by the digital camera while the digital camera is docked to the docking port.

4. The printer of claim 3, wherein the docking port is removably attached to the printer, the user interface being integral to the removably attached docking port.

5. The printer of claim 1, wherein the docking port is integral to the printer.

6. A printer that prints an image directly from a digital camera, the printer comprising:
   means for interfacing the digital camera directly to the printer, such that the image stored in the digital camera is communicated to the printer;
   means for printing that converts the image from the interfaced digital camera into a printed image; and
   an image magnifier, the image magnifier being integral to the printer and independent of the digital camera, wherein the digital camera comprises a display unit, a user of the printer viewing the image to be printed from the interfaced digital camera through the image magnifier of the printer, the image magnifier magnifying the image displayed by the display unit for the user only when the digital camera is interfaced to the printer.

7. The printer of claim 6, wherein the means for interfacing comprises a docking port, the docking port comprising a data interface that receives the image stored in the digital camera.

8. The printer of claim 7, wherein the docking port further comprises a mechanical interface to accept and hold the digital camera, and wherein the means for interfacing further comprises an adaptor that adapts any digital camera of a plurality of different digital camera makes and models directly to the docking port.

9. The printer of claim 7, wherein the means for interfacing further comprises a user interface, the user interface comprising a plurality of buttons that are manipulated by the user of the printer in conjunction with the display unit to one or more of select, view, edit and print the stored image from the digital camera.

10. The printer of claim 6, wherein the image magnifier comprises a lens and a frame that supports the lens, the image magnifier further comprising means for adjusting the image magnifier relative to the display unit to focus the magnified view.

11. A docking station that docks a digital camera with a printer for direct printing of an image stored in the digital camera, the docking station comprising:
   a docking port that comprises a mechanical interface between the digital camera and the docking station, and a data interface between the digital camera, the docking station and the printer while the digital camera is docked directly to the docking port; and
   an image magnifier integral with the docking station and independent of the digital camera, wherein the digital camera comprises a display unit, a user of the docking station viewing the image to be printed through the image magnifier of the docking station, the image magnifier being adjacent to the display unit when the digital camera is docked to provide a magnified view of the image displayed to the user.

12. The docking station of claim 11, further comprising:
   a user interface that comprises buttons or keys, the user of the docking station manipulating the keys in conjunction with the display unit to one or more of select, view, edit and print an image from a plurality of images stored by the docked digital camera.

13. The docking station of claim 11, wherein the digital camera further comprises a user interface that comprises buttons or keys, the user of the docking station manipulating the keys to one or more of select, view and edit an image from a plurality of images stored by the docked digital camera, the user directing the printer to print a selected image using the keys.

14. The docking station of claim 11, wherein the image magnifier comprises a lens supported by a frame, the frame being attached to the docking station.

15. The docking station of claim 11, wherein the docking station provides power to the docked digital camera using the docking port.

16. The docking station of claim 11, wherein the docking port is either specific to a particular digital camera or capable of interfacing to any camera of a plurality of different digital cameras.

17. The docking station of claim 11, wherein the docking port further comprises an adaptor that adapts one or both of the mechanical interface and the data interface of any digital camera of a plurality of different digital camera makes and models to the docking station.

18. A docking station that docks a digital camera with a printer for direct printing of an image stored in the digital camera, the docking station comprising:
   means for interfacing the digital camera to the docking station and to the printer, such that the image stored by the digital camera is directly communicated to the printer; and
   an image magnifier that is independent of the digital camera, wherein the digital camera comprises a display unit, a user of the docking station viewing the image to be printed from the interfaced digital camera through the image magnifier of the docking station, the image magnifier magnifying the image displayed by the display unit,
   wherein the image magnifier remains with the docking station when the digital camera is removed from the docking station.

19. The docking station of claim 18, wherein the means for interfacing comprises a docking port, the docking port comprising:

a mechanical interface that accepts and holds the digital camera in the docking port; and a data interface that receives the image stored in the interfaced digital camera and directly communicates the image to the printer, the docking station providing power to the interfaced digital camera using the docking port.

20. The docking station of claim 18, wherein the means for interfacing comprises a user interface, the user interface comprising a plurality of buttons that are manipulated by the user of the docking station in conjunction with the display unit to one or more of select, view, edit and print the stored image from the digital camera.

* * * * *